June 13, 1933. R. A. CURRIE 1,914,009
LAMP AND ADJUSTABLE MOUNTING FOR THE SAME
Filed March 5, 1931
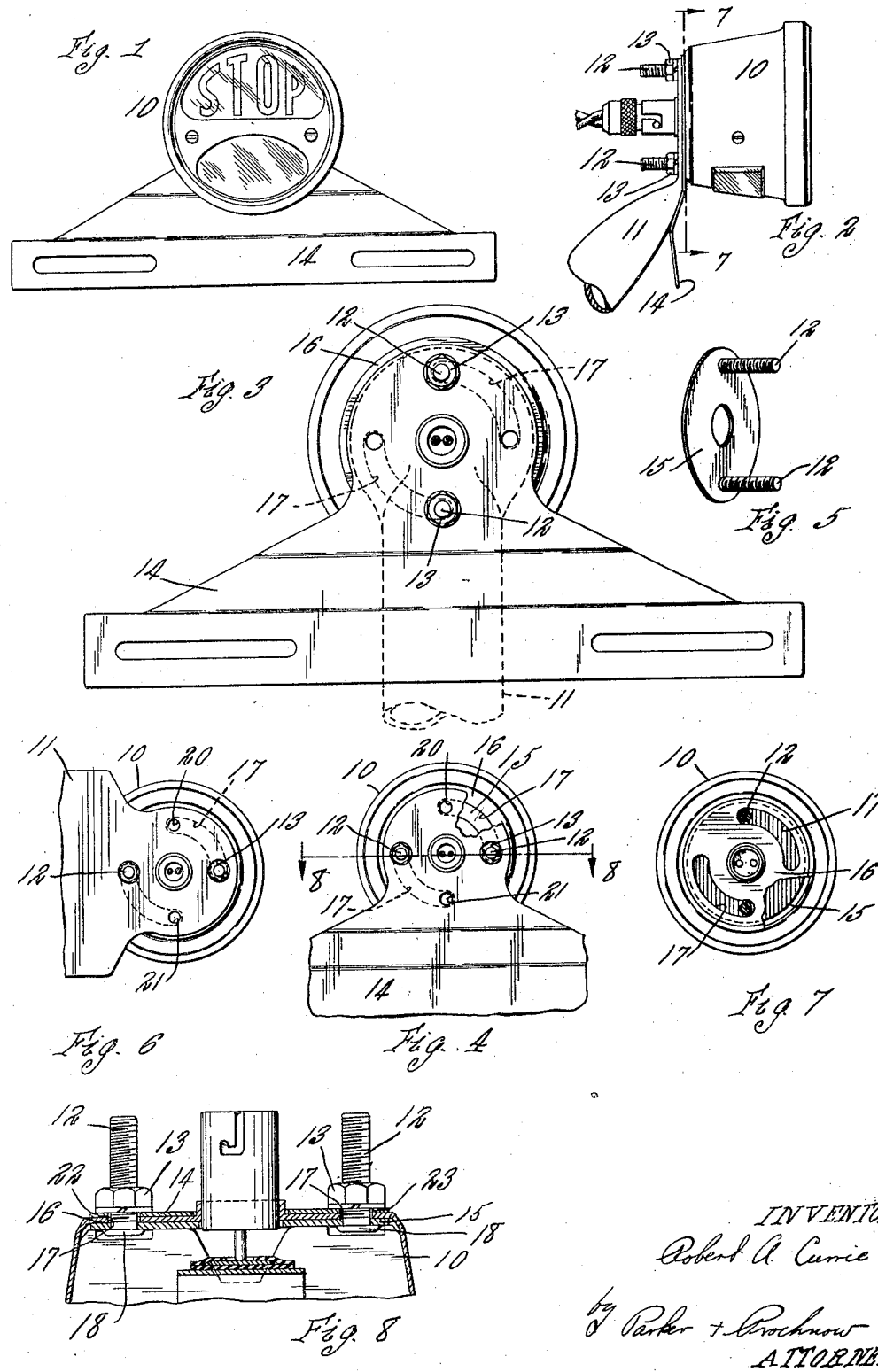
INVENTOR.
Robert A. Currie
by Parker + Prochnow
ATTORNEYS.

Patented June 13, 1933

1,914,009

UNITED STATES PATENT OFFICE

ROBERT A. CURRIE, OF SYRACUSE, NEW YORK, ASSIGNOR TO R. E. DIETZ COMPANY, OF NEW YORK, N. Y.

LAMP AND ADJUSTABLE MOUNTING FOR THE SAME

Application filed March 5, 1931. Serial No. 520,213.

This invention relates to lamps and mounting means for the same, and particularly to adjustable mounting means for tail lamps of automobiles.

The lamps used on the rear ends of automobiles, whether they are simple tail lamps, stop lamps or combination stop and tail lamps, are, at the present time, commonly mounted on the vehicle by means of two screw studs which project from the inner end of the lamp casing and are adapted to be secured by nuts in holes in a bracket or support on the vehicle, which bracket frequently also serves as the support to which the rear license plate is secured in a position beneath the tail lamp so that the license number is illuminated by light issuing through a bottom window in the lamp. In the lamp supports or brackets on some cars the holes for the attaching studs of the lamp, are arranged in a vertical line, or one above the other, while in the brackets or supports on other cars the holes for the lamp attaching studs are arranged in a horizontal line. This has necessitated the making of the lamps in two styles, one having attaching studs disposed in a vertical plane and the other having the attaching studs arranged in a horizontal plane, in order to provide a lamp adapted to be used with one or another style of lamp bracket or support. The lamp can only be secured to the bracket in one position, determined by the location of the stud-receiving holes in the bracket, and if the bracket should become bent out of the intended position, it is impossible to adjust the lamp thereon, so that the lamp can be placed in the correct upright position regardless of the deflection of the bracket or support.

One object of this invention is to provide a lamp having adjustable attaching studs so as to adapt the lamp to be mounted in the intended upright position regardless of whether the stud-receiving holes of the bracket are disposed in a vertical or a horizontal plane; also to provide a lamp with attaching studs which can be readily adjusted as may be necessary, to enter the stud holes in the lamp support or bracket, regardless of the relative position of these holes; also to provide an adjustable mounting for lamps which increases the strength of the connection between the lamp and its support; and also to improve lamps, and the mounting means therefor, in the other respects hereinafter described and set forth in the claims.

In the accompanying drawing:

Fig. 1 is an elevation of a combined stop and tail lamp for automobiles, and the license plate bracket for the same.

Fig. 2 is a side elevation thereof also showing the supporting bracket.

Fig. 3 is an elevation of the lamp and license bracket on an enlarged scale, as seen when looking rearwardly from the vehicle, and showing the attaching studs for the lamp arranged in a vertical plane.

Fig. 4 is a similar view showing the attaching studs arranged in a horizontal plane.

Fig. 5 is a detached, perspective view of the attaching studs and the plate to which they are secured.

Fig. 6 is a view similar to Fig. 4 but showing a bracket of different arrangement.

Fig. 7 is a sectional elevation of the lamp on line 7—7, Fig. 2.

Fig. 8 is a section through the rear or inner end of the lamp and one bracket on line 8—8, Fig. 4.

10 represents a tail lamp for automobiles, and 11 a bracket or support to which the lamp is attached. A combination stop and tail lamp of known type is illustrated in the drawing, but it will be understood that the invention is not limited to a lamp of this type but is also applicable to other kinds of lamps. Furthermore, the brackets or supports shown to which the lamp is secured could be of any other suitable construction and arrangement.

12 represents studs or screws which project forwardly from the inner end of the lamp casing and by means of which the lamp is secured to the bracket or support 11, these studs being adapted to be passed through holes in the bracket 11, and secured therein by means of nuts 13. A license plate bracket or holder 14 is also shown as being secured between the lamp 10 and the support 11 by the same screws 12, which is a common arrangement, but this bracket could be omitted or could be a fixed part of the lamp support, or could itself constitute the lamp support without departing from the present invention.

Instead of the studs or screws 12 being, as usual, rigidly secured to the inner end of the lamp casing, they are movably or adjustably mounted within the lamp, as for instance by means of a disk or plate 15 with which they are rigid and which is located within the lamp casing against the inside face of the inner end wall 16 of the casing, with the studs 12 extending out through one or more suitable openings or slots 17 in the end wall 16. The studs may pass through holes in the stud plate 15 and be provided with heads 18 welded to the plate 15, or the studs may be rigidly secured to the plate in any other suitable manner. The stud plate 15 is loosely retained within the lamp casing adjacent to the inner end wall 16 of the casing and is preferably circular and of sufficiently smaller diameter than the internal diameter of this end of the casing to enable the stud plate to be turned in the lamp casing to the extent permitted by the slots 17 through which the studs project. These slots are preferably of segmental circular shape concentric with the center of the end wall 16 and diametrically opposite to each other, and are long enough to permit the stud plate and the studs to be turned in the casing through an angle of ninety degrees. The studs, therefore, can be adjusted to project from the lamp casing in either a vertical diametrical plane as shown in Figs. 2, 3 and 7 or in a horizontal diametrical plane, as shown in Figs. 4 and 6. This adjustability of the lamp attaching studs 12 adapts them to be inserted either through holes arranged one above another in a vertical line in a bracket or support, or through holes in a horizontal line in the bracket. Each of the several brackets shown in the drawing is provided with one pair of holes 20 and 21 disposed in a vertical line, and also with a second pair of holes 22 and 23 disposed in a horizontal line and the studs can be adjusted so as to be received by either pair of holes. But, as ordinarily constructed, the supporting brackets have only one pair of holes, which in some brackets are in a horizontal line and in other brackets are in a vertical line. However, the described adjustability of the studs 12 adapts the lamp to be secured in proper upright position on any such supports or brackets. When the screw studs have been inserted through the holes in the brackets 11 and 14, and the nuts screwed up on the studs, the stud plate 15 will be drawn up against the inner side of the end wall 16 of the lamp casing while said end wall 16 will be drawn up against the bracket 11 or the holder 14 in case a separate holder 14 is used, all of the parts being thus clamped firmly and rigidly together by means of the screw studs 12 and their nuts 13, the lamp being thereby stationarily and rigidly secured in place.

In addition to the studs thus being adapted to be secured in either vertically or horizontally arranged holes in a bracket, or support, the nuts can be loosened and the lamp adjusted relatively to the bracket so as to secure the lamp in a correct, upright position in the event that the bracket has not been accurately positioned on the vehicle or in case it may have been accidentally bent out of the intended position in which the stud holes are in either a horizontal or a vertical line. The attaching studs 12 being thus circularly adjustable on the lamp through an angle of substantially ninety degrees, enables the attaching studs to be readily adjusted to whatever position may be necessary to secure the lamp in upright position, whether the stud holes in the bracket be disposed in horizontal or vertical line, or in any other intermediate position. Furthermore, since the attaching studs are not secured directly on the rear wall of the lamp casing but to the stud plate 15, between which, and the bracket 11, the rear wall 16 of the lamp casing is clamped when the attaching nuts 13 are tightened, a strong and durable construction is provided even though the end wall of the lamp casing may be of relatively thin or light sheet metal. Such lamps are subject to severe vibration in the use of the automobiles on which they are mounted and this construction is much more durable than a construction in which the attaching studs are fixed directly on the end wall of the lamp casing.

I claim as my invention:

1. A lamp casing having an end wall provided with slots, a plate retained in said casing and having screw studs fixed thereto and projecting out through said slots, said stud plate being angularly adjustable in the lamp casing to permit the studs to project therefrom in different positions appropriate for engaging the studs in differently positioned holes in a support, and nuts cooperating with the threaded outer ends of said studs for securing said studs to a support and for also securing said stud plate stationarily in its different adjustments in the lamp casing.

2. The combination of a lamp having a casing with slots in its end wall, a stud plate rotatably adjustable in said lamp casing at the inner side of said end wall and having studs fixed thereto and extending therefrom out through said slots and adapted to be removably inserted into holes in a support, and means cooperating with the outer ends of said studs to clamp said stud plate, end wall and support together.

ROBERT A. CURRIE.